(12) United States Patent
Varadarajan et al.

(10) Patent No.: US 7,961,672 B2
(45) Date of Patent: Jun. 14, 2011

(54) CQI FEEDBACK FOR OFDMA SYSTEMS

(75) Inventors: Badri Varadarajan, Dallas, TX (US);
Eko No. Onggosanusi, Allen, TX (US);
Runhua Chen, Dallas, TX (US); Il H. Kim, West Lafayette, IN (US)

(73) Assignee: Texas Instruments Incorporated, Dallas, TX (US)

( * ) Notice: Subject to any disclaimer, the term of this patent is extended or adjusted under 35 U.S.C. 154(b) by 482 days.

(21) Appl. No.: 12/036,066

(22) Filed: Feb. 22, 2008

(65) Prior Publication Data

US 2008/0207135 A1   Aug. 28, 2008

Related U.S. Application Data

(60) Provisional application No. 60/891,326, filed on Feb. 23, 2007, provisional application No. 60/943,219, filed on Jun. 11, 2007, provisional application No. 60/948,365, filed on Jul. 6, 2007, provisional application No. 60/953,911, filed on Aug. 3, 2007, provisional application No. 60/955,799, filed on Aug. 14, 2007, provisional application No. 60/971,464, filed on Sep. 11, 2007, provisional application No. 60/981,048, filed on Oct. 18, 2007.

(51) Int. Cl.
*H04W 4/00* (2009.01)
(52) U.S. Cl. .................. 370/328; 370/206; 370/208
(58) Field of Classification Search ........... 370/203, 370/208, 252; 375/260, 262; 455/69
See application file for complete search history.

(56) References Cited

U.S. PATENT DOCUMENTS

| | | | |
|---|---|---|---|
| 6,662,339 B1 | 12/2003 | Laneman et al. | |
| 7,457,588 B2 * | 11/2008 | Love et al. | 455/67.11 |
| 2004/0198268 A1 * | 10/2004 | Rashev et al. | 455/126 |
| 2005/0068884 A1 * | 3/2005 | Yoon et al. | 370/203 |
| 2006/0087980 A1 * | 4/2006 | Ikeda et al. | 370/252 |
| 2006/0223449 A1 | 10/2006 | Sampath et al. | |
| 2006/0285485 A1 | 12/2006 | Agrawal et al. | |
| 2007/0110100 A1 * | 5/2007 | Wunder et al. | 370/468 |
| 2008/0080635 A1 * | 4/2008 | Hugl et al. | 375/267 |
| 2008/0101407 A1 * | 5/2008 | Khan et al. | 370/468 |
| 2009/0046569 A1 * | 2/2009 | Chen et al. | 370/203 |

* cited by examiner

*Primary Examiner* — Ricky Ngo
*Assistant Examiner* — David Oveissi
(74) *Attorney, Agent, or Firm* — Ronald O. Neerings; Wade James Brady, III; Frederick J. Telecky, Jr.

(57) ABSTRACT

Embodiments of a feedback generator and decoder and methods of operating the feedback generator and decoder are presented. In one embodiment, the feedback generator includes a CQI compression module configured to provide a compressed CQI for the user equipment corresponding to at least one sub-band, where a sub-band is composed of at least one resource block. The feedback generator also includes a transmit module coupled to the CQI compression module and configured to transmit the compressed CQI to a serving base station. In one embodiment, the feedback decoder includes a receive module configured to receive a compressed CQI in the base station from user equipment corresponding to at least one sub-band. The feedback decoder also includes a CQI restoration module coupled to the receive module and configured to provide a restored CQI from the compressed CQI for the at least one sub-band.

51 Claims, 11 Drawing Sheets

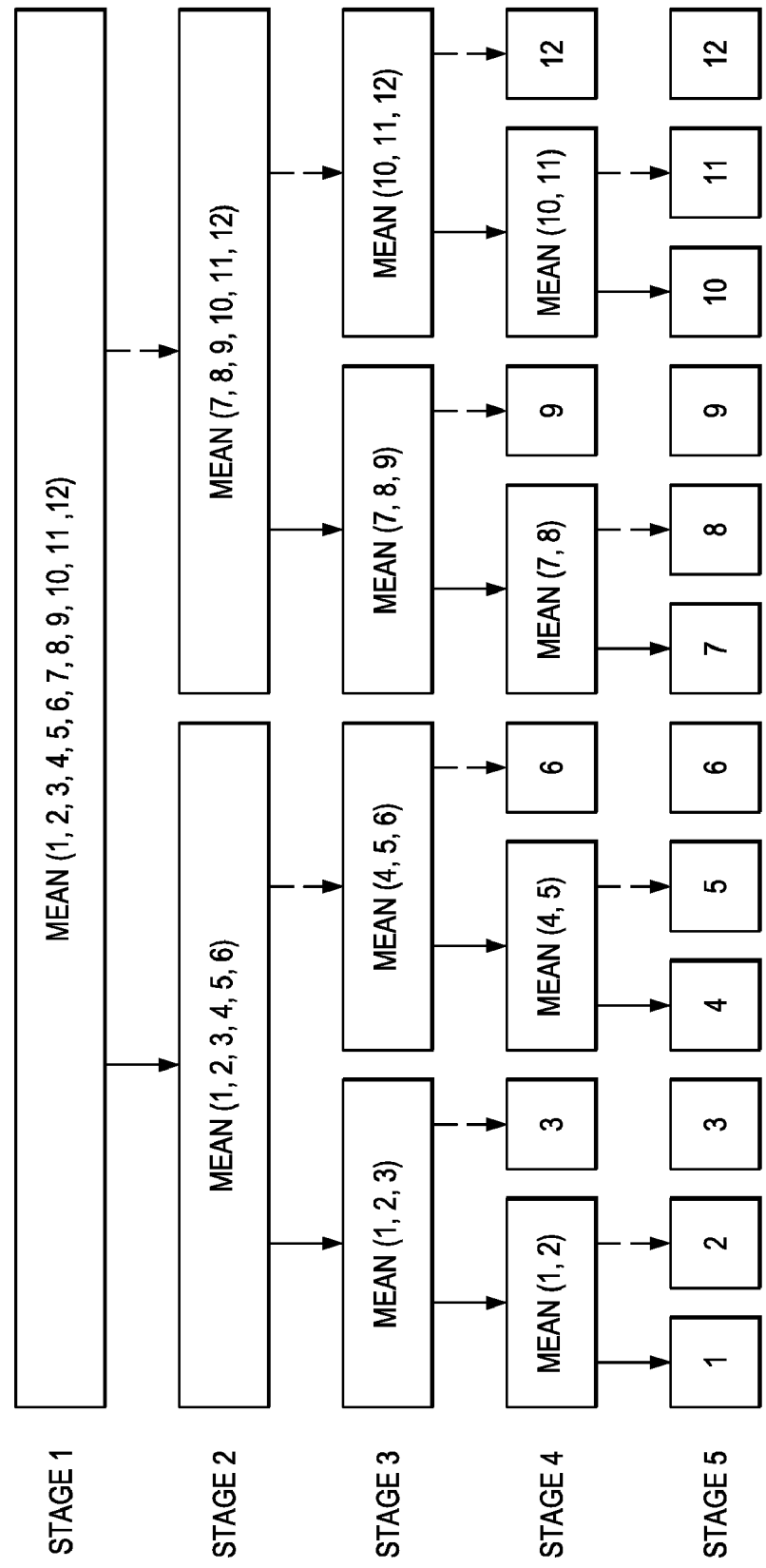

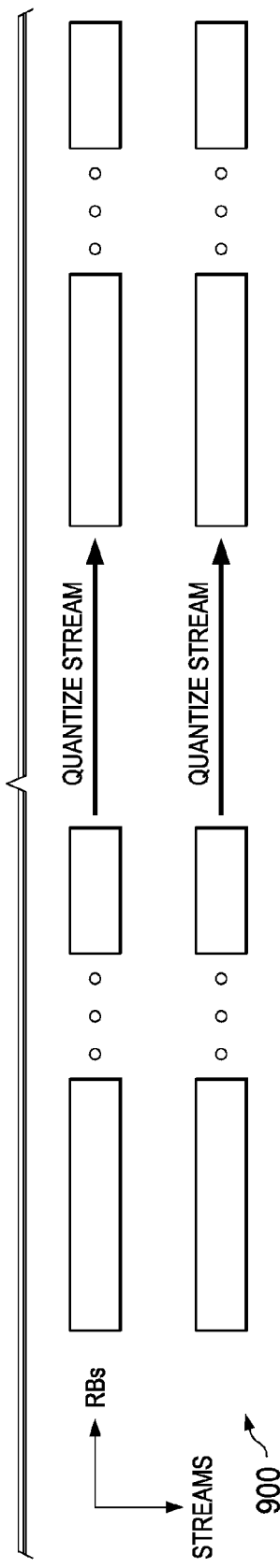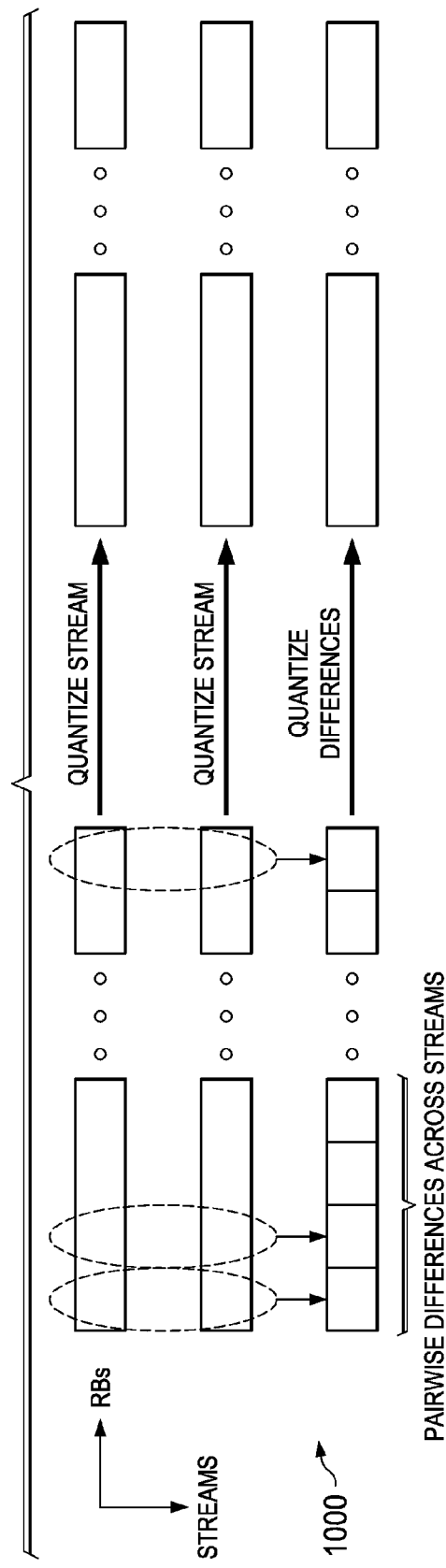

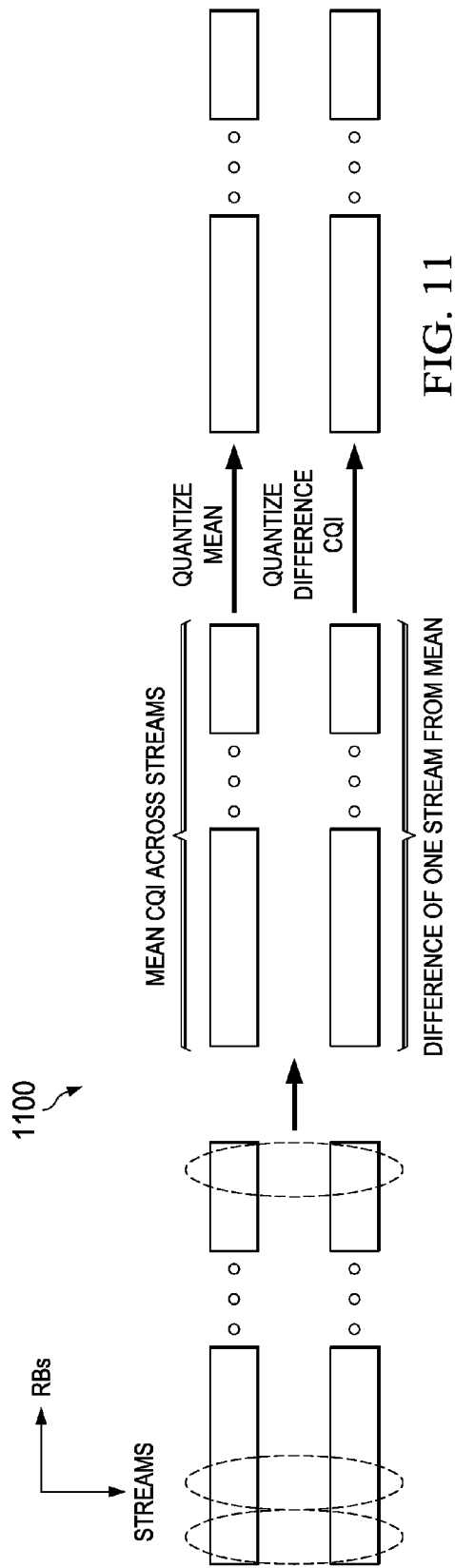

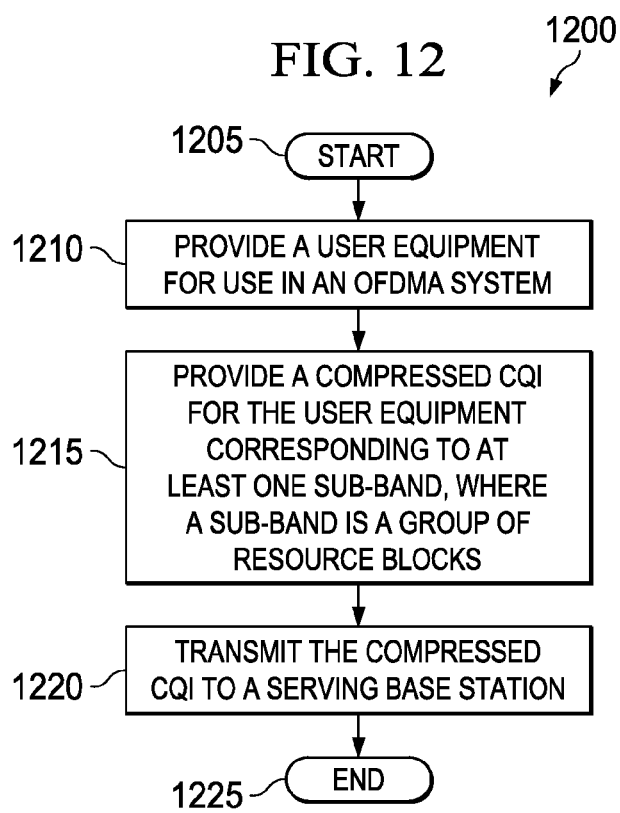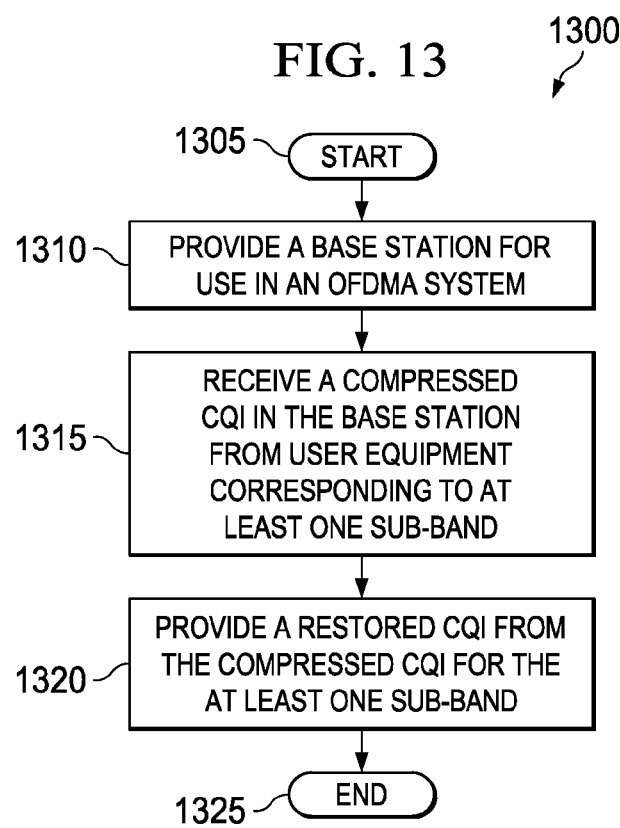

US 7,961,672 B2

CQI FEEDBACK FOR OFDMA SYSTEMS

CROSS-REFERENCE TO PROVISIONAL APPLICATIONS

This application claims the benefit of U.S. Provisional Application No. 60/891,326 entitled "COI Feedback for OFDMA Systems" to Badri Varadarajan, et al., filed on Feb. 23, 2007, which is incorporated herein by reference in its entirety.

This application also claims the benefit of U.S. Provisional Application No. 60/943,219 entitled "COI Feedback for OFDMA Systems" to Badri Varadarajan, et al., filed on Jun. 11, 2007, which is incorporated herein by reference in its entirety.

This application additionally claims the benefit of U.S. Provisional Application No. 60/948,365 entitled "COI Feedback for OFDMA Systems" to Badri Varadarajan, et al., filed on Jul. 6, 2007, which is incorporated herein by reference in its entirety.

This application further claims the benefit of U.S. Provisional Application No. 60/953,911 entitled "COI Feedback for OFDMA Systems" to Badri Varadarajan, et al., filed on Aug. 3, 2007, which is incorporated herein by reference in its entirety.

This application also further claims the benefit of U.S. Provisional Application No. 60/955,799 entitled "COI Feedback for OFDMA Systems" to Badri Varadarajan, et al., filed on Aug. 14, 2007, which is incorporated herein by reference in its entirety.

This application still further claims the benefit of U.S. Provisional Application No. 60/971,464 entitled "COI Feedback for OFDMA Systems" to Badri Varadarajan, et al., filed on Sep. 11, 2007, which is incorporated herein by reference in its entirety.

This application yet further claims the benefit of U.S. Provisional Application No. 60/981,048 entitled "COI Feedback for OFDMA Systems" to Badri Varadarajan, et al., filed on Oct. 18, 2007, which is incorporated herein by reference in its entirety.

TECHNICAL FIELD

The present disclosure is directed, in general, to wireless communications and, more specifically, to a feedback generator, a feedback decoder and methods of operating a feedback generator and a feedback decoder.

BACKGROUND

A key principle in orthogonal frequency division multiple access (OFDMA) communication systems is that the total operating bandwidth is divided into sub-carriers, also called resource blocks (RBs), where transmissions for user equipment (UE) occur in an orthogonal (i.e., not mutually interfering) manner. Each RB can potentially carry data to a different UE. The scheduler at the transmitter (also known as base station or Node B) selects the UEs to be scheduled in a given time period and also determines which RBs are used for each UE. By scheduling each UE on RBs where it has high signal-to-interference and noise ratio (SINR) and by adapting the transmission data rate to the SINR on the scheduled RBs, the scheduler can improve the data throughput to each UE and therefore also the overall system throughput. To enable near-optimum frequency domain scheduling of UEs in the RBs of the operating bandwidth, each UE feeds back the channel quality indicator (CQI) metric it might potentially experience for each RB or some combination of RBs to its serving Node B. Improvements in the process of feeding back this information would prove beneficial in the art.

SUMMARY

Embodiments of the present disclosure provide a feedback generator, a feedback decoder and methods of operating the feedback generator and decoder. In one embodiment, the feedback generator is for use in user equipment of an OFDMA system and includes a CQI compression module configured to provide a compressed channel quality indicator (CQI) for the user equipment corresponding to at least one sub-band, where a sub-band is a group of k resource blocks ($k \geq 1$). The feedback generator also includes a transmit module coupled to the CQI compression module and configured to transmit the compressed CQI to a serving base station. In one embodiment, the feedback decoder is for use in a base station of an OFDMA system and includes a receive module configured to receive a compressed CQI in the base station from user equipment corresponding to at least one sub-band. The feedback decoder also includes a CQI restoration module coupled to the receive module and configured to provide a restored CQI from the compressed CQI for the at least one sub-band.

In another aspect, the disclosure provides a method of operating a feedback generator that is for use in user equipment of an OFDMA system. In one embodiment, the method includes providing a compressed CQI for the user equipment corresponding to at least one sub-band, where a sub-band is a group of resource blocks and transmitting the compressed CQI to a serving base station. In one embodiment, the disclosure provides a method of operating a feedback decoder in a base station that is for use in an OFDMA system. The method includes receiving a compressed CQI in the base station from user equipment that corresponds to at least one sub-band and providing a restored CQI from the compressed CQI for the at least one sub-band.

BRIEF DESCRIPTION OF THE DRAWINGS

For a more complete understanding of the present disclosure, reference is now made to the following descriptions taken in conjunction with the accompanying drawings, in which:

FIG. 3 illustrates a diagram of an embodiment of hierarchical granularity refinement constructed according to the principles of the present disclosure;

FIG. 9 illustrates MIMO spatially independent CQI compression for feed back to a base station constructed according to the principles of the present disclosure;

FIG. 10 illustrates MIMO spatially differential CQI compression for feed back to a base station constructed according to the principles of the present disclosure;

FIG. 11 illustrates MIMO joint difference coding CQI compression for feed back to a base station constructed according to the principles of the present disclosure;

FIG. 12 illustrates a flow diagram of an embodiment of a method of operating a feedback generator carried out according to the principles of the present disclosure; and FIG. 13 illustrates a flow diagram of an embodiment of a method of operating a feedback decoder carried out according to the principles of the present disclosure.

DETAILED DESCRIPTION

Some examples of a channel quality indicator (CQI) include SINR, recommended or supportable spectral efficiency, recommended or supportable modulation-and-coding scheme (MCS) and mutual information. Since CQI is typically quantized or discrete, a set of possible CQI values may be predefined, and the index of the corresponding CQI value is reported.

While accurate CQI feedback enhances the ability of a scheduler at a serving Node B to select UEs and their data rates, it also incurs feedback overhead on the uplink (UL) from the UE to the serving Node B. To minimize this overhead, it is beneficial to use compression techniques to efficiently feed back the CQI information from different UEs to the serving Node B. This may be done by recognizing that for a given UE, the CQI feed back across multiple RBs is often strongly correlated. In addition, it is also possible to exploit the system property (e.g., the Node B scheduler) to selectively compress the CQI with only marginal loss in system throughput.

Embodiments of the present disclosure exploit these properties and propose specific approaches to reduce the CQI feedback overhead in UL communications with the serving Node B. Additionally, embodiments employ CQI compression techniques for the case of one spatial stream and provide extension for the case of multiple-input, multiple-output (MIMO) communication where more than one spatial stream is multiplexed.

Figure 1A:
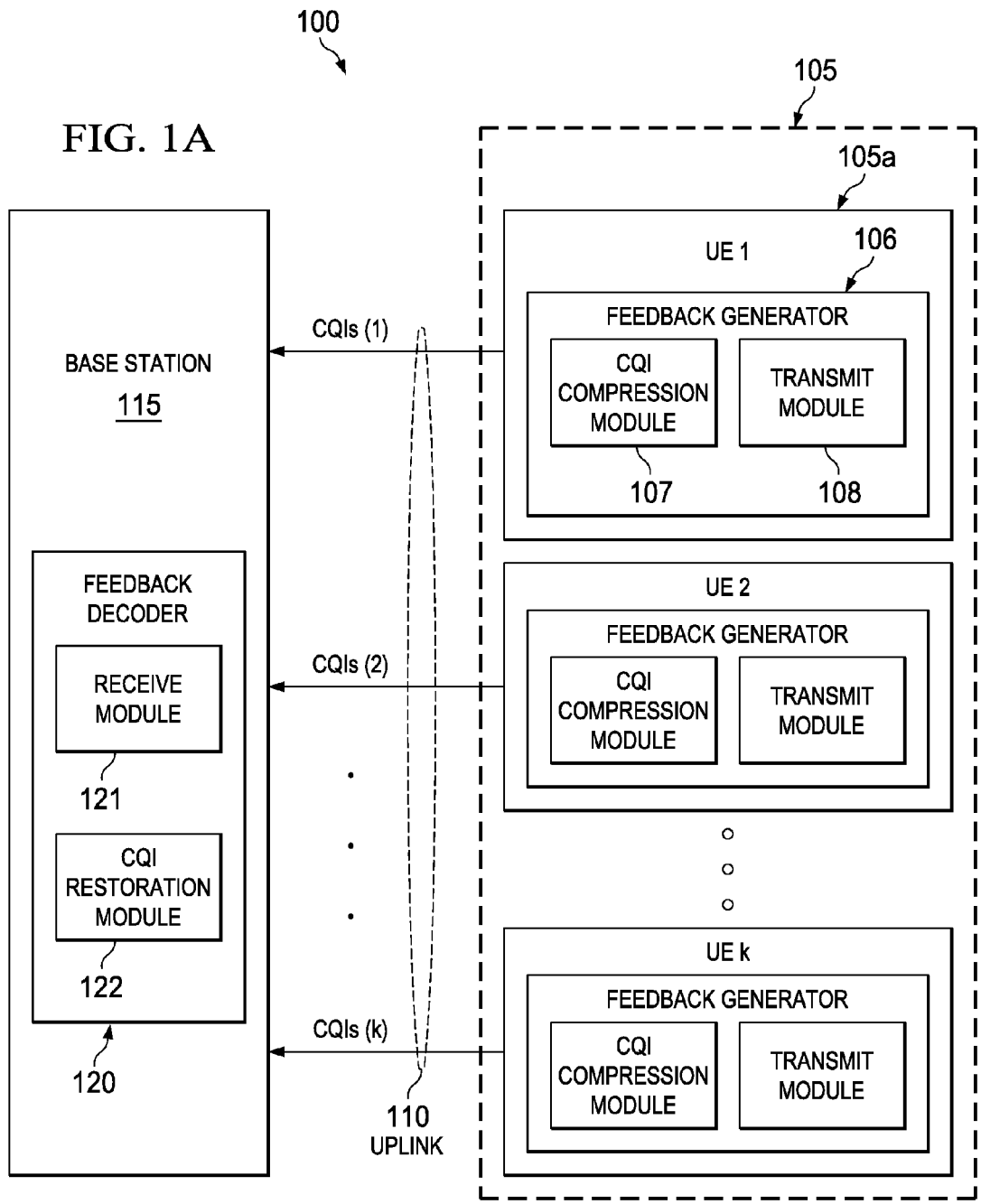
FIGS. 1A and 1B illustrate functional diagrams of an uplink portion and a downlink portion of a communications system as provided by one embodiment of the disclosure.
Figure 1B:
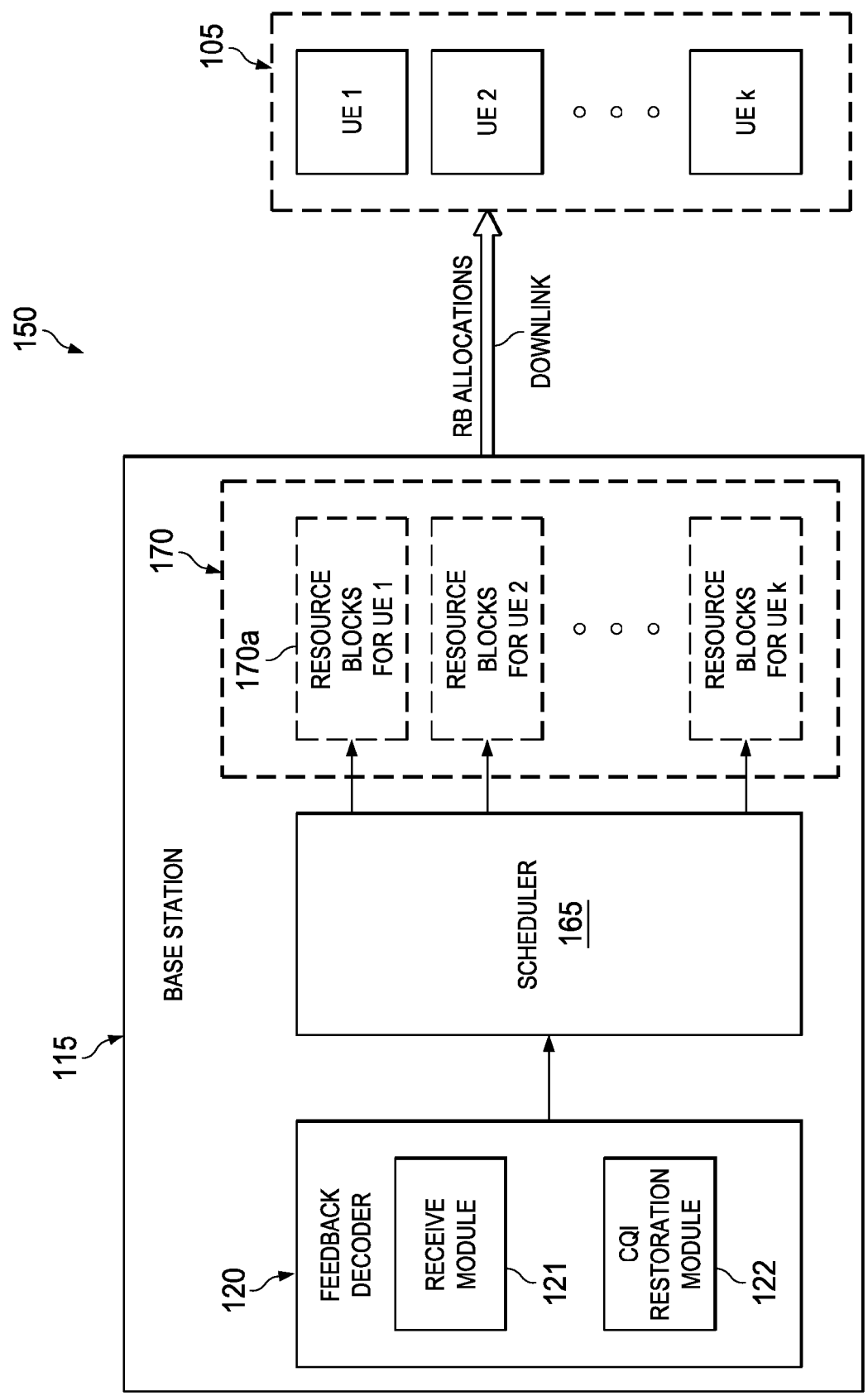

FIGS. 1A and 1B illustrate functional diagrams of an uplink portion 100 and a downlink portion 150 of a communications system as provided by one embodiment of the disclosure. In the illustrated embodiment, the communications system is an orthogonal frequency division multiple access (OFDMA) system, which provides a total operating bandwidth divided into non-overlapping RBs. The RBs provide transmissions for different UEs that occur in an orthogonal or substantially independent manner wherein each RB can potentially carry data to a different UE.

The illustrated uplink portion 100 includes a plurality of UEs 105 wherein a first UE 105a is representative. The uplink portion 100 also includes a plurality of compressed CQIs 110 corresponding to each of the plurality of UEs 105 that is provided over a wireless feedback channel to a serving Node B 115.

In the uplink portion 100, the first UE 105a includes a feedback generator 106 that has a CQI compression module 107 and a transmit module 108. The feedback generator 106 is representative of feedback generators in the remaining plurality of UEs 105. The base station 115 includes a feedback decoder 120 that has a receive module 121 to recover a feedback signal transmitted by the UEs. The feedback decoder 120 also has a CQI restoration module 122, which provides a restored CQI (i.e., reverses the CQI compression by the UE) from the feedback signal that may occur on one or more RBs.

FIG. 1B depicts an exemplary downlink transmission system 150. After decoding of the feedback signal and CQI restoration, the uncompressed CQI of different UEs is provided to a scheduler 165 in the Node B 115. The scheduler 165 selects the UEs to be transmitted on each RB along with corresponding modulation and coding schemes. Modulation and coding is provided for the different UEs, and a resulting signal is then summed up and transmitted on a downlink channel to the plurality of UEs 105.

The CQI compression module 107 is configured to provide a compressed CQI for the UE 105a corresponding to at least one sub-band, where a sub-band is a group of k resource blocks ($k \geq 1$). The transmit module 108, which is coupled to the CQI compression module 107, is configured to transmit the compressed CQI to the serving Node B, as shown. The receive module 121 is configured to receive the compressed CQI corresponding to at least one sub-band from the UE 105a. The CQI restoration module 122, which is coupled to the receive module 121, is configured to provide a restored CQI from the compressed CQI for the at least one sub-band.

Figure 2:
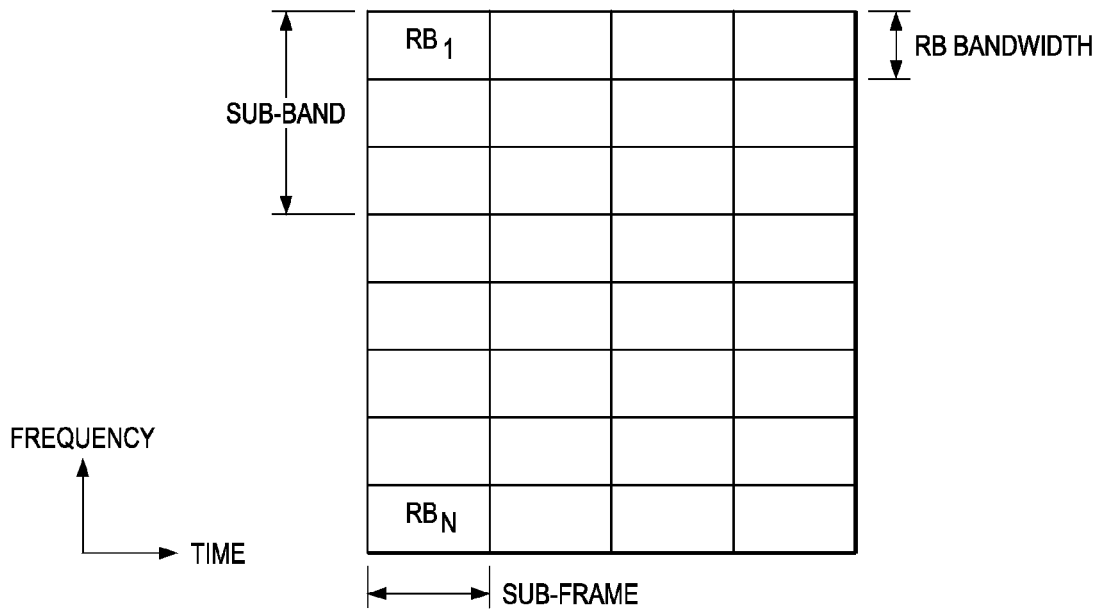
FIG. 2 illustrates a diagram of a frequency-time operating resource space as may be employed by an OFDMA communications system such as shown in FIGS. 1A and 1B.

FIG. 2 illustrates a diagram of a frequency-time operating resource space 200 as may be employed by an OFDMA communications system such as shown in FIGS. 1A and 1B. An operating bandwidth of the operating resource space 200 may be divided into N resource blocks ($RB_1$-$RB_N$) wherein each of the N resource blocks may be defined as a set of adjacent sub-carriers (tones). For example, a 3GPP LTE system with 5 MHz bandwidth employs 25 RBs wherein each has a 180 kHz bandwidth for a total operating bandwidth of 4.5 MHz, with the remaining 0.5 MHz providing a guard band separating transmissions on two adjacent bands on different cells. A sub-band of the operating bandwidth corresponds to a collection of one or more RBs, as shown. One sub-band is defined as the smallest unit for CQI reporting. That is, the RBs may also be concatenated to form larger ones thereby fundamentally reducing the CQI reporting overhead and the control channel overhead in the downlink that signals their allocated RBs to UEs that have been scheduled. Based on the channel and interference and noise variance estimates, the UE computes a CQI for each RB, which may be denoted $S_1, S_2, \ldots, S_N$. As previously mentioned, some examples of CQI are SINR, recommended or supportable spectral efficiency, recommended or supportable modulation-and-coding-scheme (MCS), received signal strength and mutual information. Since the CQI is typically quantized or discrete, a set of possible CQI values is predefined, and the index of the corresponding CQI value is reported.

Referring again to FIGS. 1A and 1B, various embodiments of the present disclosure for providing CQI compression are presented below. Predistortion of a compressed CQI may be employed by the UE to ensure that quantization errors obey desired or predefined properties. In general, predistortion may be applied to any quantization scheme. In one approach, the UE quantizes the compressed CQIs. Then, before feedback to the Node B, it locally recreates the CQIs using the same reconstruction scheme used by the Node B. The UE then examines the quantization error between the actual and restored CQIs. It then modifies some of the quantization bits to optimize some error metric.

More specifically, for any sub-band wherein the reconstructed CQI is greater than the actual CQI might result in the Node B using an unsupportably high modulation and coding scheme, resulting in transmission errors. Thus, it is desirable to reduce the number of sub-bands for which the CQI is overestimated due to quantization. To combat this, the UE can count the number of sub-bands for which the CQI is overestimated. If this number exceeds a threshold, it can decrease a mean or base-layer CQI feedback for schemes that use the mean. Alternatively, the UE can adjust the mean (or base-layer) CQI feedback to impose a limit on the maximum error between reconstructed and actual CQI fed back. Again, it is emphasized that CQI predistortion is a quantization technique which may be used in combination with any compression approach, including the ones discussed below.

A down-sampled CQI compression approach may be employed to reduce feedback to the Node B. In down-sampled feedback, the UE feeds back quantized versions of the CQI on every $K^{th}$ sub-band. Hence, only $$\left\lceil \frac{N}{K} \right\rceil$$

values are fed back, instead of N values in complete feedback. The Node B may use some type of interpolation function (e.g., linear, cubic spline or sinc) to obtain the CQI in each non-reported sub-band. Thus, for K=2, the UE may feed back $\{S_1, S_3, S_5 \ldots\}$ or $\{S_2, S_4, S_6 \ldots\}$, and the Node B can use interpolation among $\{S_1, S_3, S_5 \ldots\}$ to obtain $\{S_2, S_4, S_6 \ldots\}$ or the opposite, respectively.

A predistorted down-sampled CQI compression approach may also be employed. In predistorted down-sampled CQI feedback, a UE still feeds back only $$\left\lceil \frac{N}{K} \right\rceil$$

values as in down-sampled feedback. However, the UE is also assumed to have further knowledge of the interpolation used by the Node B to restore or reconstruct the CQI. Such knowledge is typically available through one of the following. The reconstruction mechanism is fixed in a standard, either explicitly or implicitly since the reconstruction and feedback mechanisms are intrinsically tied together. Alternately, the reconstruction mechanism may be dependent on the UE's geometry or other feedback quantities, of which the UE is aware. The reconstruction mechanism may also be signaled to the UE, either individually or through higher layer signaling or as a cell parameter.

In all the above cases, the UE knows the reconstruction mechanism used by the Node B, so it may predistort the fed back CQI quantities to optimize (minimize) the error in the reconstructed CQI to a degree required. Of course, different optimization criteria may be chosen for the predistortion used.

For example, suppose $e_k$ is the CQI error in the $k^{th}$ sub-band, where the CQI is either represented in a linear or a dB scale. The UE can estimate $e_k$ because it knows both the actual CQI and the restored CQI based on its own feedback. Then, an optimization cost function may be chosen from the mean of $e_k^2$ across all sub-bands or the maximum of $e_k^2$ across all sub-bands. Alternatively, it may be chosen as a maximum of some other function $e_k$, which reflects the fact that CQI over-estimation is more harmful than CQI under-estimation. One example is $e_k^2 - \alpha U(e_k)$ where $\alpha$ is some constant greater than zero and $U(x)$ is 1 if $x<0$ and 0 otherwise. Generally, the UE can predistort its CQI feedback values so that the chosen cost function is optimized.

Frequency differential CQI compression provides another embodiment of the present disclosure. This compression approach uses the fact the CQIs on neighboring (or adjacent) sub-bands are often close to each other in value because a particular channel response may not substantially vary in frequency between two sub-bands. Thus, one can quantize the difference between the CQI of two neighboring sub-bands with fewer bits than required for the absolute CQI itself. For example, the UE quantizes the CQI of the central sub-band $S_{N/2}$ to get $F_{N/2}$. Here, N is the number of sub-bands. The precision used for storing $F_{N/2}$ may be high. For example, four bits may be used. The use of the central sub-band is exemplary, since any other sub-band may be used in a similar fashion.

Then, for $i=N/2+1, N/2+2, \ldots, N$, quantize $(S_i - F_{i-1})$ to get $D_i$. Note that the dynamic range of $D_i$ is typically much less than that of $S_i$, hence fewer bits can be used. For instance, two bits may be used for the differential CQI. Compute $F_i = F_{i-1} + D_i$ to enable quantization of the next $S_i$. Similarly for $i=N/2-1, N/2-2 \ldots 1$, quantize $(S_i - F_{i+1})$ to get $D_i$. Compute $F_i = F_{i+1} + D_i$ to enable quantization of the next $S_i$. Then, the UE feeds back the base CQI $F_{N/2}$ and $\{D_1, D_2, \ldots, D_{N/2-1}\}$, $\{D_{N/2+1}, D_{N/2+2}, \ldots, D_N\}$. The Node B reconstructs the CQIs sequentially following the equations $F_i = F_{i-1} + D_i$ and $F_i = F_{i+1} + D_i$. In addition, it is also possible to apply additional smoothing (e.g., via filtering) at the Node B after reconstructing the CQI.

Since the channel profile may vary over time, it may also be beneficial to configure the sub-band size (i.e., the parameter k, where k is the number of RBs per sub-band) semi-statically either by the Node B or the network. The Node B can signal the change in k to the UE via higher layer signaling or broadcast channel. While it is beneficial to have multiple possibilities for k, the number of possibilities may also be kept small for simplicity. It is also possible to select different values of k depending on the system bandwidth.

Wideband and differential CQI compression affords another embodiment of the present disclosure. Wideband CQI is defined as a single CQI that represents all the sub-bands of interest within the system bandwidth or a portion of the system bandwidth in the case of partial reuse. That is, the term "all sub-bands" may refer to a set or subset of all the available sub-bands that are semi-statically configured by the Node B or network on higher layers (including the possibility of using all the sub-bands within the system bandwidth). The mean CQI across all the sub-bands of interest may be used as a wideband CQI although other CQI statistics are also possible (e.g., some type of non-linear averaging or median across sub-bands of interest). This compression approach is similar to frequency differential compression. Here, the fact that the individual CQIs are densely concentrated around the wideband CQI is used. Further, the correlation of CQIs in adjacent sub-bands may be used to design joint quantizers for adjacent sub-bands. More precisely, the approach first computes and quantizes a base wideband CQI across all sub-bands. Let the wideband CQI value be $F_0$. The precision used for storing $F_0$ may be high (e.g., four bits may be used). Then, the difference between the CQI for each of the N sub-bands is derived relative to $F_0$. Different quantization schemes can be used (e.g., joint across sub-bands or a separate quantizer per sub-band) to obtain $D_1, D_2, \ldots, D_N$. Note that the dynamic range of $D_i$ is typically much less than that of $S_i$, hence fewer bits can be used. For instance, two bits may be used. The Node-B then derives the sub-band CQI $S_n$ from $D_n$ and $F_0$.

In one variant of the above approach, the UE reports the differential CQI for only a few selected sub-bands. Here, a single CQI can be reported for each of the selected sub-bands. Alternatively, a single CQI can be used to represent all the selected sub-bands. In this case, the Node B uses the aforementioned single CQI when the UE is scheduled within the selected sub-bands. For the other sub-bands, the Node B uses the wideband CQI to schedule the UE. The sub-bands for which the UE reports the differential CQI(s) can either be configured by the Node B, or chosen by the UE. For example, the UE could report the differential CQI(s) for only the sub-bands with large CQI. When the UE selects the reporting sub-bands, the UE may also report some indicator for the positions of the selected sub-bands.

The use of wavelet coefficients provides another embodiment of CQI compression. One view of CQI compression is that the vector $s=[S_1, S_2, S_3, \ldots, S_N]^T$ needs to be represented. Clearly, this can be done by using a set of (N×1)M basis vectors $w_1, w_2, \ldots, w_M$ and finding coefficients $\{c_i\}$ such that the error between s and $\Sigma_i w_i c_i$ is optimized. Typically, the basis vectors $w_1, w_2, \ldots, w_M$ may be chosen to be mutually orthogonal.

Different cost functions to measure optimality may be used, as discussed above. The set of basis vectors is fixed. Examples include polynomial vectors where the $j^{th}$ term of $w_i$ is $j^{i-1}$, and Fourier vectors, where the $j^{th}$ of $w_i$ is $$\cos\left(\frac{2\pi ij}{N}\right)$$

for $$i = 1, 2, \ldots \frac{M}{2}$$

and $$\sin\left(\frac{2\pi ij}{N}\right)$$

otherwise.

Difference based wavelets may also be employed. Here the first basis vector is $$\frac{[1 \ 1 \ \ldots \ 1]^T}{N}.$$

The $i^{th}$ basis vector is chosen to be $[0 \ldots 0 \ 1-a_i \ a_i a_i \ a_i \ldots a_i]$, where $$a_i = \frac{1}{N-i+1}.$$

It is easy to check that these vectors are orthogonal. The first coefficient represents the mean. The second coefficient represents the difference of the first CQI with respect to the mean, etc. The quantization range of the coefficients varies depending on their dynamic range. For example, $c_1$ uses four bits. But, $c_2, c_3, \ldots$ can use two bits or less. In general, the precision may be reduced as i increases. Using these basis vectors, the UE finds coefficients $\{c_i\}$ that represent the CQI vector s. The Node B uses the received coefficients to reconstruct s as $\Sigma_i w_i c_i$.

One more specific example is to use a Hadamard matrix (Hadamard transform) approach. Hadamard matrices have elements of $\{+1, -1\}$ which are orthogonal. The property that Hadamard matrices have only $\{+1, -1\}$ components facilitates quantization, thereby reducing quantization ranges by differentiating two consecutive CQIs. Equation (1) below is an example of a Hadamard matrix, for N=4.

$$H = \frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (1)$$

The first row represents the mean of CQIs across different sub-bands. The second row is the sum of the difference of the first CQI and the second CQI, and the difference of the third CQI and the fourth CQI. As expected, because the difference for two consecutive CQIs can be small, the second transformed CQI may be quantized with fewer bits than the first transformed CQI. For the third and fourth transformed CQI, the same logic may be applied. An additional advantage is that arithmetic operations of the Hadamard transform needs only additions and subtractions.

There always exists an N×N Hadamard matrix when N is a multiple of four. Therefore, the Hadamard matrix may be used when the number of CQIs to be fed back is a multiple of four. When the number of CQIs is not a multiple of four, the following approach may be used. First, the remainder of the number of CQIs divided by four (P=mod(N, 4)) is obtained. Among N CQIs, the best P entries are chosen, and these entries are quantized by full bits (e.g., four bits). The number of remaining CQIs is a multiple of four. Then we generate a Hadamard matrix and encode the remaining CQIs by the Hadamard matrix. Then one of the encoded CQIs is an average of the remaining CQIs and this is quantized by more bits. The differential CQIs are quantized by fewer bits.

A second approach is to increase the original number of CQIs to the next multiple of four that is larger than the original number of CQIs. For example, if there are 25 CQIs to be fed back, we increase the number of CQIs to 28, which is a multiple of four. Then dummy information is put into the increased CQI positions. The dummy information may be the mean of the CQIs. Then, with the modified number of CQIs, the Hadamard matrix approach of CQI compression may be employed.

FIG. 3 illustrates a diagram of an embodiment of hierarchical granularity refinement 300 constructed according to the principles of the present disclosure. The hierarchical granularity refinement 300 is a specific example of different-based wavelets. Here, the wavelet coefficients are chosen such that at any given point of time, the frequency granularity is refined by half. Thus, one CQI is calculated across the all of the frequency band (which represents a wideband CQI) in stage 1. Then in stage 2, the granularity is refined by giving the difference between the left half of the band and the earlier all-band CQI. The right half of the band is assumed to lie symmetrically on the opposite side of the all-band CQI. After this refinement, estimates of the CQI in the right and left halves of the band are provided. Then, in stage 3, the granularity can be refined to a fourth of the band, as shown. This process may be continued to stage 4 for individual sub-bands, if desired.

The above quantization can be represented by a linear transformation of the original CQIs using difference based wavelets. Specifically, the transformation matrix for N CQIs is given by the N $$\left[\begin{array}{cccc}\frac{1}{N} & \frac{1}{N} & \cdots & \frac{1}{N}\end{array}\right] \quad (2)$$

$$[B(N)] \quad (3)$$

where B(N) is the (N−1×N) matrix recursively defined as $$B(N) = \left[\begin{array}{cccccc}\left(\frac{1}{N} - \frac{1}{2N}\right) & \left(\frac{1}{N_1} - \frac{1}{2N}\right) & \cdots & \frac{-1}{2N} & \frac{-1}{2N} & \cdots \\ \left[B\left(\frac{N}{2}\right)\right] & & & 0 & & \\ 0 & & & B(N-N_1) & & \end{array}\right] \quad (4)$$

for $N_1 = \frac{N}{2}$.

The use of combinatorial compression provides another embodiment of CQI compression. In the case where the feedback quantity is a discrete one (e.g., the index of a recommended modulation-and-coding scheme (MCS) or payload size), combinatorial techniques may be used for feedback. For example, the sub-band CQI to be fed back is an integer lying close around a wideband CQI value $S_0$, which is typically strongly dependent on the UE's geometry. In that case, one can achieve efficient feedback by exploiting this fact.

For example, the UE can feed back a base wideband CQI value and then compress the others by using their difference with respect to the base CQI. This is similar to the approaches discussed with respect to frequency differential CQI and wideband plus differential CQI compression with the modification that combinatorial techniques exploiting the integer property of the differences may be used. Specifically, this fact may be used to develop a codebook of quantized CQI vectors. Then, the actual CQI vector is rounded off to a nearest element in the codebook, and the index of that element is fed back. Many embodiments of this general principle are possible. In fact, the previous differential CQI compression schemes are special cases of this approach.

In addition, different measures of closeness for quantization can be used. One exemplary measure is the L1 or L2 norm of the difference between the actual CQI and the elements of the codebook. This is straightforward to do since distances between integer vectors are computationally less challenging than the original real-field vector quantization problem. Note that such measure may be simply regarded as a UE implementation issue.

One other example of such a combinatorial approach is provided below for compressing the CQIs. Let $S=\{S_1, \ldots, S_N\}$ be CQIs to be fed back. First, a wideband or base CQI value is computed from the vectors S. This value may be the quantized mean of $\{S_i\}$, the quantized median of $\{S_i\}$, the quantized mean of the minimum and maximum values as $$S_0 = \left\lceil \frac{\max(S) + \min(S)}{2} \right\rceil, \quad (5)$$

or any other formula representing a wideband/base CQI such as some type of non-linear averaging. Essentially, the base CQI represents a single CQI for all the N sub-bands of interest as taught throughout the description. Next, the differences $D=\{D_1, \ldots, D_N\}$ given by $$D_i = S_i - S_0 \quad (6)$$

are calculated. The index or indicator representing the difference is then reported along with the wideband (base) CQI.

Now, a codebook $C=\{C_1, C_2, \ldots, C_P\}$ of all valid feedback difference vectors is chosen. For example, the codebook may consist of a well-chosen set of zero-sum vectors which approximate actual difference vectors D with high probability. As another example, the codebook may consist of zero-sum sequences, which contain at least $K(\leq N)$ zero elements, with all other elements being +1 or −1. As another example, one may choose zero-sum sequences with optimized inter-element Euclidean distances using, for example, the Lloyd algorithm.

Given the codebook, the UE chooses the codebook element that is closest to the actual difference vector D. The metric of closeness could be, for example, the Euclidean distance. Thus, the chosen feedback vector for a difference vector D is $$C_i = \begin{array}{c} \operatorname{argmin}\|D - C_j\|_2 \\ 1 \leq j \leq P \end{array} \quad (7)$$

The index i in the codebook and the base value $S_0$ are fed back. The Node B reconstructs the CQI by adding the quantized difference vector $C_i$ to the base layer CQI $S_0$. Assuming say a four bit representation of the base layer CQI $S_0$, the total number of required feedback bits is $4+\lceil \log_2 P \rceil$.

There are several approaches to building codebooks. A first approach is based on channel statistics and a second approach uses constructive ways to build codebooks. For codebook design based on channel statistics, channel statistics are collected and differential CQIs, with an appropriate base wideband CQI $S_0$, are calculated. With collected channel statistics of differential CQIs, patterns are counted that occur and P patterns are obtained from a codebook. For example, assume that $\{d_1, d_2, d_1, d_3, d_4, d_1, d_2, d_1, d_4\}$ is a set of collected statistics of differential CQIs. Then $d_1$ occurs four times, $d_2$ occurs three times, $d_3$ occurs once, and $d_4$ occurs twice. If the codebook size is 2(P=2), then $C=\{d_1, d_2\}$ would be a good exemplary choice. If codebook size is 3(P=3), then $C=\{d_1, d_2, d_4\}$ may be a good exemplary choice. A further exemplary restriction may be that each of $d_i$ is a zero-sum vector. Another exemplary restriction might be that the integer values in each element of $d_i$ can only be of $\{0, \pm M, \pm(M-1), \ldots, \pm 1\}$.

Figure 4A:
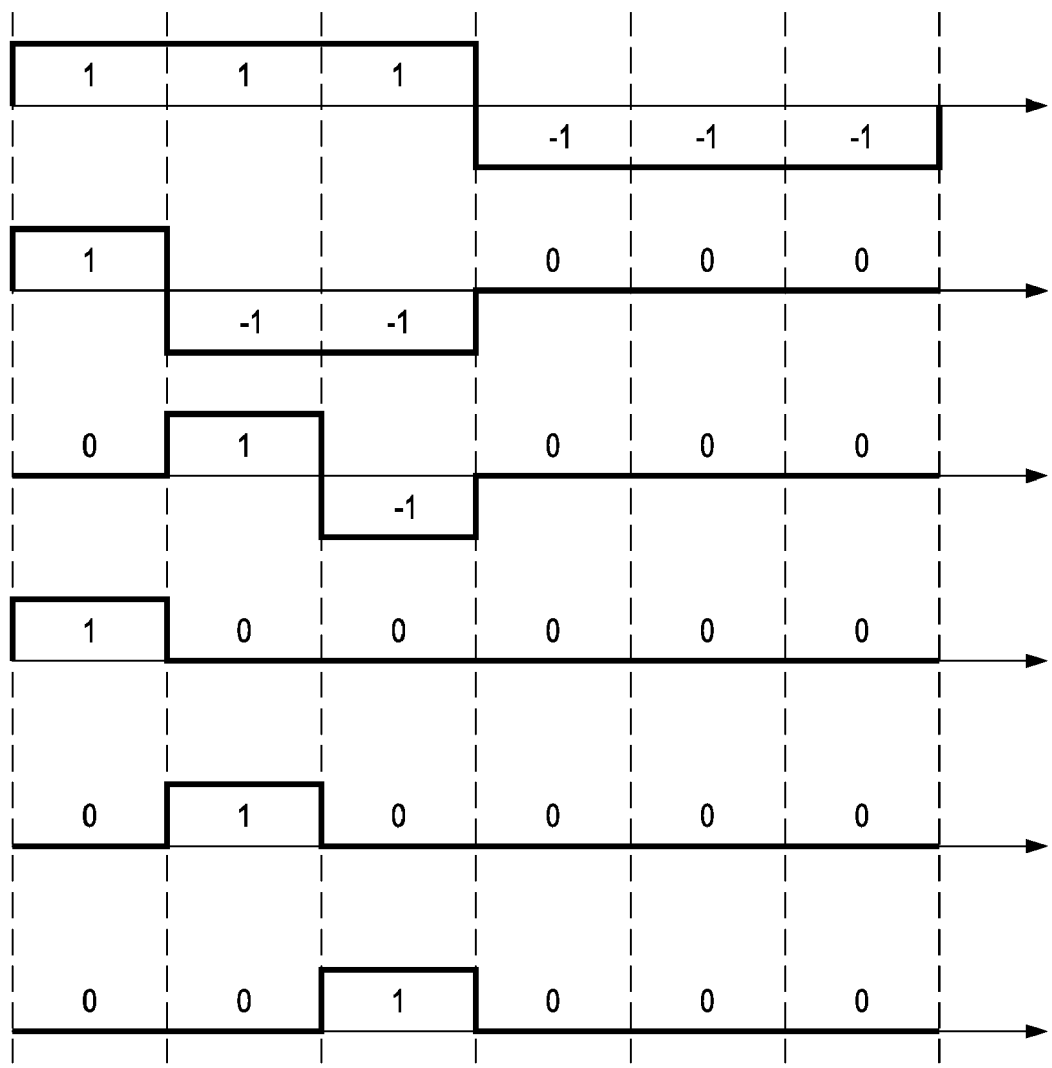
FIGS. 4A and 4B illustrate embodiments of first and second half-interval codewords for a Haar-based codebook design constructed according to the principles of the present disclosure.
Figure 4B:
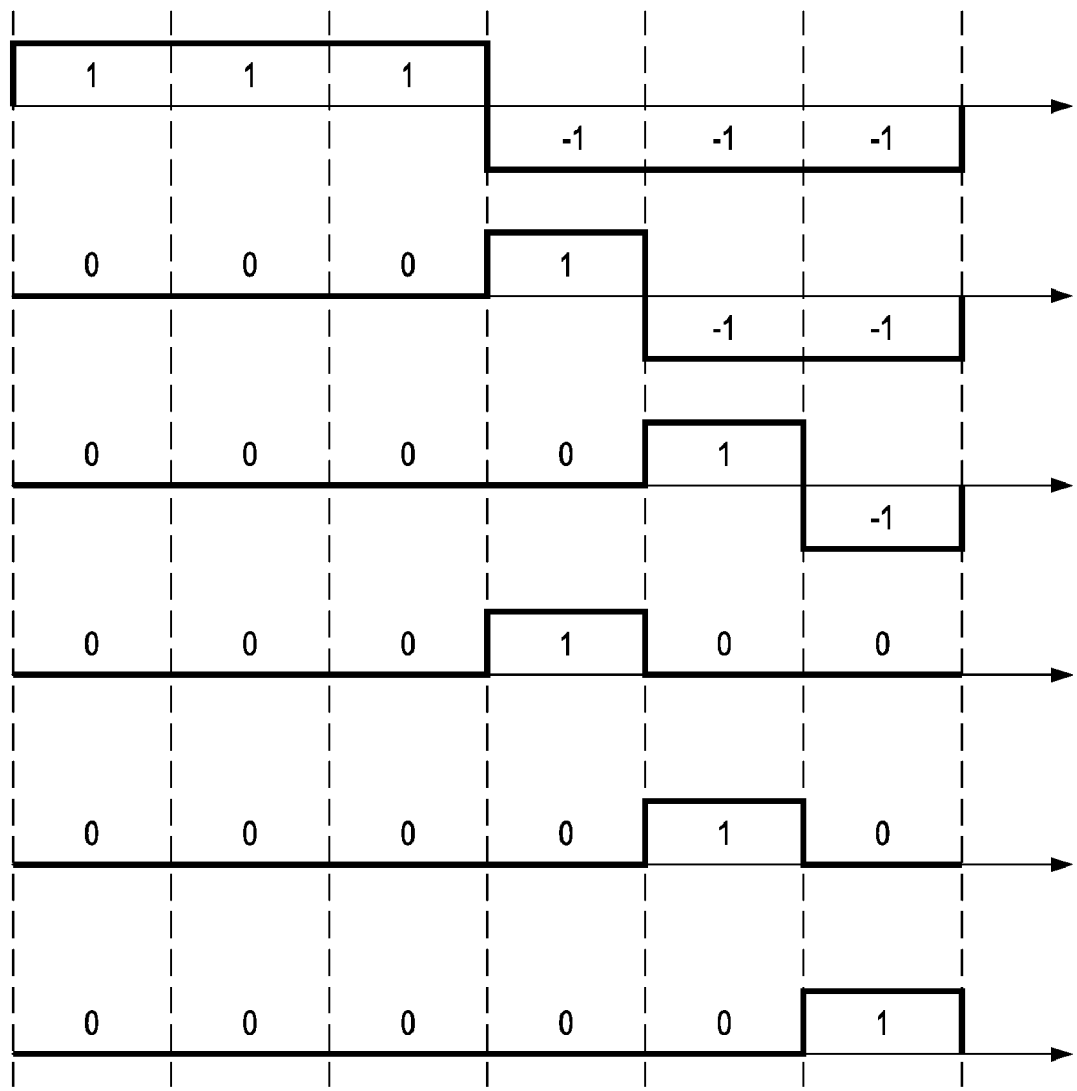

In some situations, constructive codebook design approaches are needed to build deterministic codebooks. Several constructive codebook design approaches are discussed below. FIGS. 4A and 4B illustrate embodiments of first and second half-interval codewords 400, 450 for a Haar-based codebook design constructed according to the principles of the present disclosure. Haar functions can provide a role as basis functions in functional spaces. An example for six CQIs using Haar functions is discussed below.

First, the entire interval is divided by two. The first half-interval consists of +1s and the second half-interval consists of −1s. Therefore, a first codeword is {+1, +1, +1, −1, −1, −1}, as shown. The first half-interval is again divided and the first portion of the first half-interval also consists of a +1 and the remainder of the first half-interval consists of −1s. This provides another codeword {+1, −1, −1, 0, 0, 0}, as shown. This continues to provide a total of six codewords, as shown in FIG. 4A. The second half-interval is likewise divided to produce an additional five codewords as shown in FIG. 4B. Therefore, the total number of codewords is 11.

To better represent possible CQI vectors, codewords of the negative signs of the previous generated codewords may be generated. For example, taking the negative sign of the first codeword $\{+1, +1, +1, -1, -1, -1\}$ provides $\{-1, -1, -1, +1, +1, +1\}$. Therefore, for six CQIs, there are 2×11+1=23 codewords in a codebook, which allows five bits to describe the codewords in the codebook. The codebook may be extended to have more than ±1 values. That is, if C is a codebook, a new extended codebook is $$C^i = \bigcup_{i=1}^{M} iC,$$

where $iC \equiv \{iC_1, \ldots, iC_P\}$.

A Haar+Hadamard-based codebook may also be constructed according to the principles of the present disclosure. A condition associated with the Haar-based codebook is that only half of the intervals are non-zero. To mitigate this situation, a Haar-based codebook may be combined with a Hadamard codebook taken from a Hadamard matrix. If N is not a multiple of four, a number L is obtained, which is a multiple of four larger than N. Hadamard codewords can be taken from each column of an L×L Hadamard matrix. In this approach, the total codebook can be given by $$C^i = \bigcup_{i=1}^{M} iC_{Haar} \cup \bigcup_{i=1}^{M} iC_{Hadamard} \tag{8}$$

where $C_{Haar}$ is a Haar codebook and $C_{Hadamard}$ is a Hadamard codebook.

Figure 5:
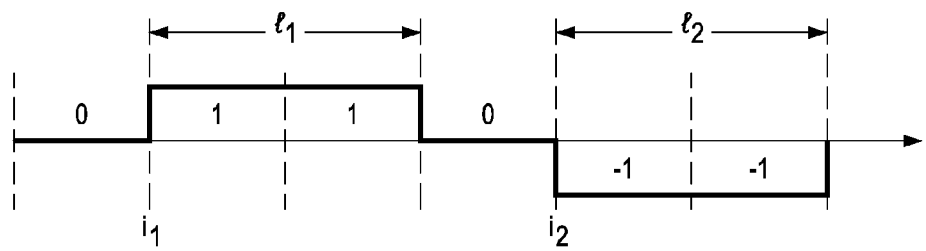
FIG. 5 illustrates an embodiment of a run length codebook constructed according to the principles of the present disclosure.

Many real-life channels often do not vary significantly in frequency. As a result, the CQI seen by the UE often stays constant over a "run" of successive sub-bands. This fact is exploited by run-length based codebooks, which are an embodiment of the present disclosure. FIG. 5 illustrates an embodiment of a run length codebook 500 constructed according to the principles of the present disclosure. As shown, the run length codebook 500 can be parameterized by $i_1, i_2, l_1, l_2$, where $i_1$ and $i_2$ are the starting locations of +1s and −1s, and $l_1$ and $l_2$ are the lengths of consecutive +1s and −1s, respectively. A set of these collections forms the run length codebook. There can be several constraints on $l_1$ and $l_2$. For example, one constraint may be where $l_1 = l_2$ so that the sum of elements of codewords is zero.

The constraint for $l_1 = l_2$ may be any integer between 0 and $$\left\lfloor \frac{N}{2} \right\rfloor.$$

If this constraint is adopted, the number of codewords may be calculated as follows. If N=2k+1 (an odd number), the number of codewords equals $$\frac{k(4k+5)(k+1)}{3} + 1.$$

If N=2k (an even number), the number of codewords equals $$\frac{k(4k-1)(k+1)}{3} + 1.$$

The codebook may be extended to have more than ±1 values in the codeword elements. Then the codebook is given by $$C^i = \bigcup_{i=1}^{M} iC_{RunLength} \tag{9}$$

The above example deals with only two runs in the codebook. In general, there may be more than two runs and the above codebook is a special instance of a general run length codebook. Every possible union of these codebooks can form a codebook. If there are too many codewords in the codebook, a subset of an entire run length codebook may be selected as a codebook. For example, the level may be restricted to have a specific number m and a run length to have a specific number l.

Figure 6:
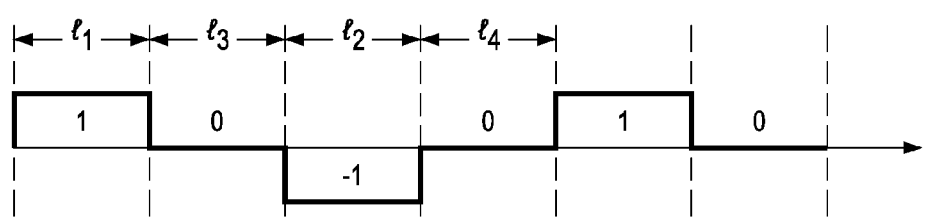
FIG. 6 illustrates an embodiment of a run length codebook with oscillation constructed according to the principles of the present disclosure.

Since real-life channels consist of a few channel taps in the time domain, they may correspondingly be oscillatory in the frequency domain. Consequently, the corresponding CQI takes on an oscillatory form, which can be exploited using the principles of this disclosure. In particular, FIG. 6 illustrates an embodiment of a run length codebook with oscillation 600 constructed according to the principles of the present disclosure. The oscillatory run length codebook 600 has +1 and −1 elements with oscillation. The oscillatory run length codebook 600 can be parameterized by $l_1, l_2, l_3, l_4$, where $l_1$ and $l_2$ are the lengths of consecutive +1s and −1s, respectively and $l_3$ and $l_4$ are the length of consecutive 0s between the +1s and −1s and between the −1s and +1s, respectively. A set of these collections forms a codebook.

There can be several constraints on $l_1, l_2, l_3, l_4$. For example, there can be a constraint where $l_1 = l_2$. Additionally, there can be a constraint where $l_3 = l_4$ so that the waveform of the codewords is purely periodic. A cyclic shift of the codewords may be allowed to provide many other codewords. For example, if there is a codeword $\{1 \ 0 \ -1 \ 0 \ 1 \ 0\}$ as shown in FIG. 6, the cyclic shift of the codeword $\{0 \ 1 \ 0 \ -1 \ 0 \ 1\}$ is also a codeword.

The codebook may be extended to have more than ±1 values in the elements of codewords. Then the codebook is given by $$C^i = \bigcup_{i=1}^{M} iC_{RunLength} \tag{10}$$

If there are too many codewords in the codebook, a subset of the entire run length codebook may be selected as a codebook. For example, the level may be restricted to have a specific number m and a run length to have a specific number l.

Figure 7:
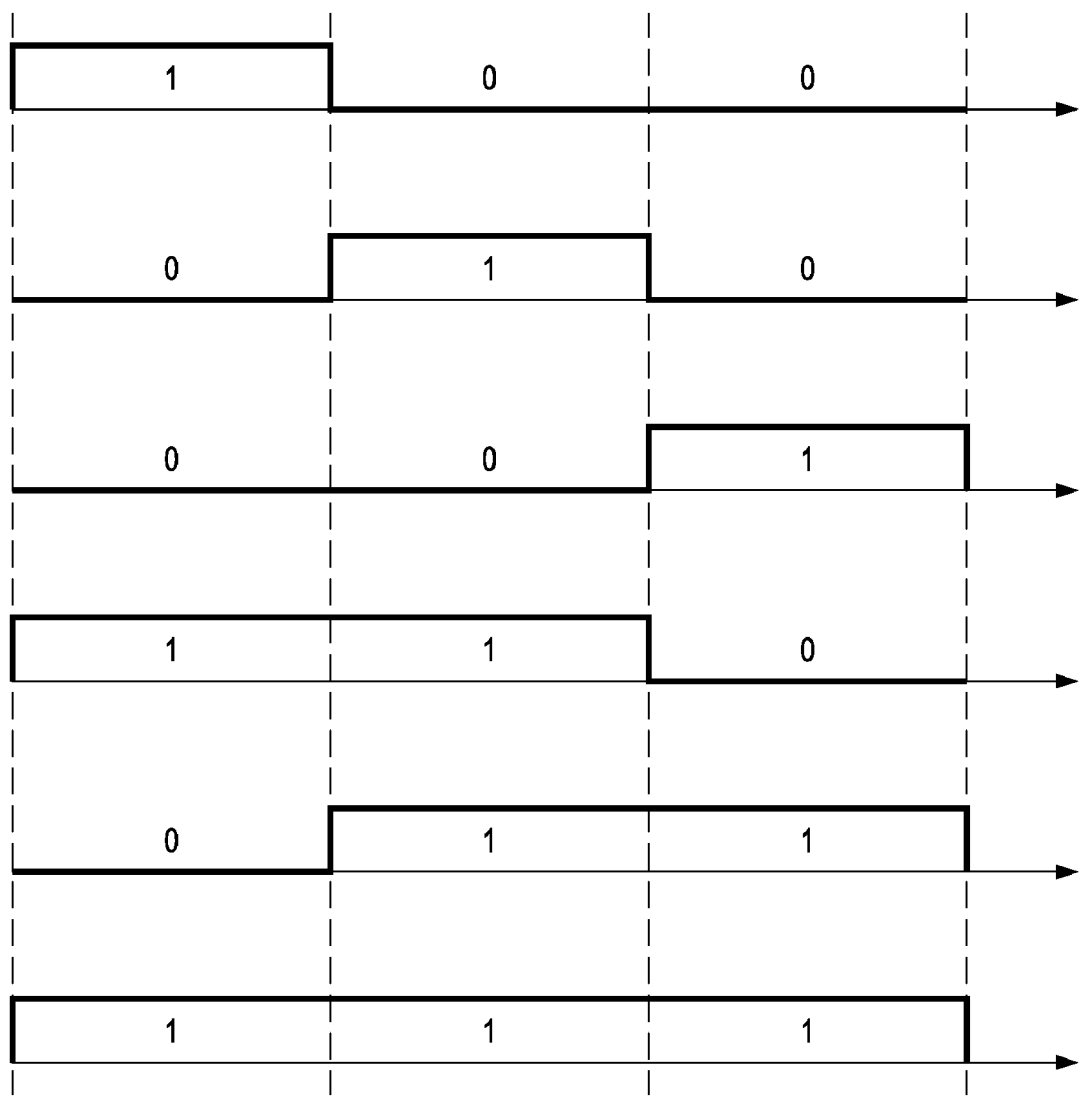
FIG. 7 illustrates an embodiment of a codebook composed of elements of ones and zeros and constructed according to the principles of the present disclosure.

FIG. 7 illustrates an embodiment of a codebook 700 composed of elements of ones and zeros and constructed according to the principles of the present disclosure. The codebook 700 is designed containing elements of 1s and 0s in codewords for three clusters as shown in FIG. 7. The mean base value of CQIs with usual Euclidean distance may be employed or another variation of base values using the following approach. First, take a base value $$S_0 = \max_{1 \leq i \leq N} S_i - 1$$

and choose the best codeword that minimizes the Euclidean distance. The codebook containing only 1s and 0s may be generalized to have 2s and 0s, 3s and 0s, ..., Ms and 0s. That is, as discussed previously, if C is a codebook, $$C' = \bigcup_{i=1}^{M} iC$$

is an extended codebook.

The approach may also be extended as follows. Take several base values $$S_0(m) = \max_{1 \leq i \leq N} S_i - m,$$

$1 \leq m \leq M$. Take the differences $D(m) = \lfloor D_1(m) \ldots D_N(m) \rfloor$ between MCS CQIs and several base values.

$$D_i(m) = S_i - S_0(m) \quad (11)$$

Find the codewords that have the minimum Euclidean distances with respect to each level m.

$$C_l(m) = \operatorname{argmin} \|D(m) - C_j(m)\|_2 \quad (12)$$
$$1 \leq j \leq P$$

Among M levels, find the codeword that minimizes the minimum Euclidean distance.

$$C_l(m) = \operatorname{argmin} \|D(m) - C_l(m)\|_2 \quad (13)$$
$$1 \leq m \leq M$$

Feed back the codewords and the level m that minimize the Euclidean distance. As in other cases, it may be noted that the Euclidean distance is only an exemplary distance measure, and an actual receiver may use other distance measures while finding a close approximation to the actual CQI.

Figure 8:
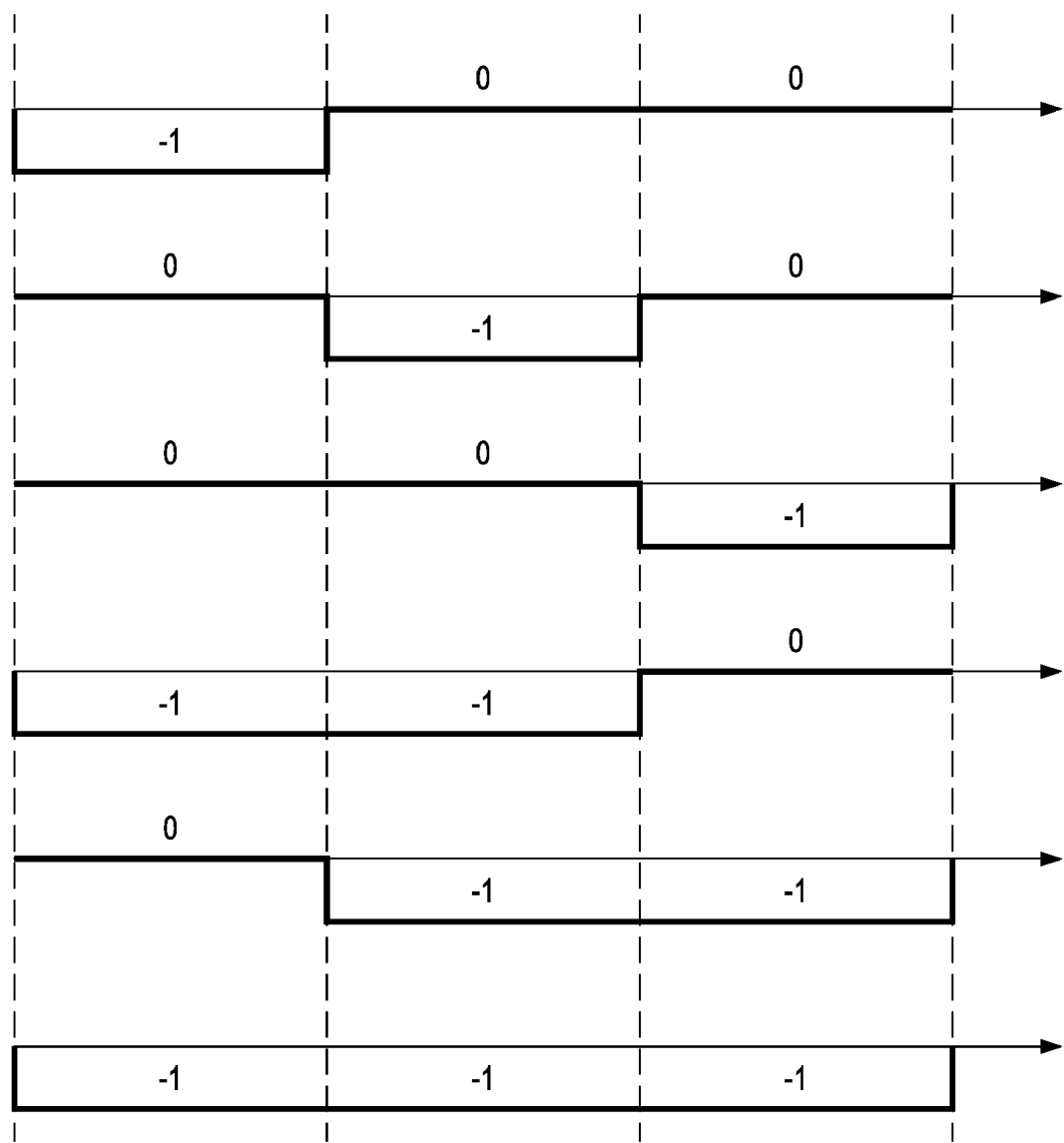
FIG. 8 illustrates a diagram of an embodiment of pulse shaped CQI compression constructed according to the principles of the present disclosure.

FIG. 8 illustrates a diagram of an embodiment of pulse shaped CQI compression 800 constructed according to the principles of the present disclosure. This scheme follows the general concept of vector quantization where the frequency-domain CQI profile is quantized to a finite set of predetermined profiles. As a frequency domain CQI varies around a mean (base) CQI, quantizing the differential CQI profile becomes a more efficient way of representation.

This scheme forms a set of pre-defined pulse vectors that consists of 0s and 1s, 0s and −1s or +1s and −1s. The rationale behind such a set is that the variation of CQI is often slow across sub-bands, and contiguous sub-bands often have similar CQIs. The position and width of a pulse identifies a fraction of bandwidth that has a more superior channel condition than the remaining bandwidth, which corresponds to one of the channel profiles shown in FIG. 8. Although FIG. 8 shows only negative pulses, positive pulses may also be used. Additional constraints, when necessary, may be applied to the pulse shape profile to restrict the number of pulses, the magnitude of each pulse or the width of the pulses.

For a larger number of CQIs, new sets of codebooks using extensions of previous codebooks may be designed. Additionally, existing codebooks for a smaller number of CQIs may be employed to design codebooks for a larger number of CQIs. For example, if there are codebooks for N CQIs and there is a requirement for 2N CQIs, the codebooks for N CQIs may be concatenated to provide codebooks for 2N CQIs. More specifically, if $C_1, C_2 \in C$ are two codewords for N CQIs, $C = [C_1 \ C_2]$ can be a codeword for 2N CQIs.

Selective sub-band CQI compression affords another embodiment of the present disclosure. Instead of feeding back the CQIs on every sub-band, the frequency domain can be divided into several sub-bands with each sub-band consisting of a group of continuous N sub-bands, where N varies between one and the total number of sub-bands. The compression techniques embodied in this disclosure may also be applied to sub-bands.

The size of a sub-band may be adaptively configured by the system resource and channel profile to more closely reflect the frequency domain channel variation. For example, in a channel having a profile with less frequency dispersion and small delay, channel variation is small in the frequency domain. Therefore, a larger sub-band may be used. On the other hand, a more frequency dispersive channel typically necessitates a smaller sub-band to provide enough frequency domain CQI granularity. The CQI of a sub-band may be defined by averaging each CQI of the sub-bands included in the sub-band. Some examples of averaging algorithms are arithmetic averaging and exponential averaging.

Selective sub-band feedback refers to the mechanism of choosing a number of sub-bands and feeding back their CQIs. Sub-band selection criteria may be decided by either the Node B, the UE or both (e.g., round robin, the highest SINR, the highest single band throughput, etc.). The selection may be static, semi-static or instantaneous. Quantization of the selected sub-band CQIs may be performed independently or using quantization techniques addressed herein.

Sub-band selection may follow one or several of the following criteria. Select a fixed number of sub-bands, where the number may be configured by the Node B or the UE. Some exemplary principles for the sub-band selection include the sub-bands having the highest throughput, SINRs or other CQI metrics. Select a varying number of sub-bands where the sub-band number may be adaptively configured. For example, the sub-bands whose performance metric (e.g., SINR or throughput) is within a specified range of a certain performance reference (e.g., SINR, throughput of another one or subset of sub-bands) may be selected. Of course, other adaptive sub-band selection approaches may be employed.

Quantization of the CQIs of the selected sub-band may follow one or a combination of the following criteria. The absolute value of the CQI may be employed. Alternately, the average CQI of the selected sub-bands may be used. Here, averaging may be performed based on any function (e.g., arithmetic mean, geometric mean or exponential averaging). A differential value of the CQI with respect to a reference value may also be used. The reference value may be determined employing the CQIs of the selected sub-bands or using all sub-bands. For example, an average CQI of all sub-bands, an average CQI of the selected sub-bands or the CQI of neighboring sub-bands may be employed.

Optionally, a single average CQI for the unselected sub-bands may be employed. This average CQI may be calculated either with or without the selected sub-bands. This, however, may not be necessary if the average CQI across all sub-bands is used as a reference value. Of course, other CQI compression schemes employed on the CQIs of the unselected sub-bands may also be applied. As mentioned before, the term "all sub-bands" may refer to a set or subset of all the available sub-bands that are semi-statically configured by the Node B or network on higher layers (including the possibility of using all the sub-bands within the system bandwidth).

It should be noted that the above selective sub-band CQI compression is a special case of the codebook-based CQI compression. As an example, the codebook for the compressed CQI that comprises one wideband CQI (representative of all the sub-bands of interest), and a single CQI, which represents a subset of Q selected sub-bands (defined differentially relative to the wideband CQI) can be constructed as follows:

$$C = \left\{ \bigcup_{i=1}^{M} iC_Q \right\} \quad (14)$$

Here, i represents a positive differential CQI value relative to the wideband CQI with M possible values. It is assumed that the CQI corresponding to the Q selected sub-bands is higher than the wideband CQI. The set $C_Q$ consists of Q (+1-valued) pulses which represents the positions of the selected sub-bands. Hence, $$P = M \binom{N}{Q}$$

where $$\binom{N}{Q} = \frac{N!}{Q!(N-Q)!}$$

(the number of possible combinations in selecting Q out of N sub-bands (Q≦N). Assuming that the wideband CQI is represented in four bits, the number of bits for the compressed CQI is:

$$4 + \lceil \log_2 P \rceil = 4 + \lceil \log_2 M \rceil + \left\lceil \log_2 \binom{N}{Q} \right\rceil \quad (15)$$

If the zero differential CQI value is included, the set in equation (15) can be modified as follows:

$$C = \left\{ 0_Q, \bigcup_{i=1}^{M} iC_Q \right\}. \quad (16)$$

Furthermore, if the negative differential CQI values are included, the set becomes as follows:

$$C = \left\{ \bigcup_{i=-M_1}^{-1} iC_Q, 0_Q, \bigcup_{i=1}^{M_2} iC_Q \right\}. \quad (17)$$

Principles of the present disclosure also apply to the case of multiple-input, multiple-output (MIMO) OFDMA systems, where the Node B and the UEs employ multiple antennas. Therefore, multiple spatial streams can be sent to a UE on a resource block. To support MIMO transmission, additional feedback from the UE may be required. In one exemplary embodiment, the UE determines the optimal transmission rank, (i.e., the number of spatial layers to be multiplexed) and the CQI for each stream on each sub-band. It is assumed that the transmission rank is the same on all sub-bands, thereby giving the same number of CQIs to be fed back per sub-band. Several approaches are presented to feed back CQIs for different spatial transmission streams. These are illustrated in FIGS. 9, 10 and 11.

FIG. 9 illustrates MIMO spatially independent CQI compression 900 for feed back to a base station constructed according to the principles of the present disclosure. Here, the CQIs for different transmission streams are quantized independently. For each spatial transmission stream or codeword, any frequency-domain compression approach previously presented may be applied. The quantized outputs may or may not be jointly coded before feedback.

FIG. 10 illustrates MIMO spatially differential CQI compression 1000 for feed back to a base station constructed according to the principles of the present disclosure. Again, the frequency-domain compression approaches previously presented may be applied to one transmission stream's CQI. Then, the difference between the chosen stream's CQI and the other stream's CQI is computed on each sub-band. The difference CQI (also known as differential CQI) is then compressed using the techniques discussed.

While it is clear that the spatial differential CQI corresponding to the mean or center sub-band requires fewer bits than the first-stream CQI, it is not clear if such reduction occurs for the other sub-bands (frequency-domain differential or non-center sub-bands). Hence, it is also possible to apply the spatial differential only to the center sub-band or the wideband (e.g., mean) CQI across sub-bands.

In the embodiment shown in FIG. 10, the difference is computed between the streams before compression. In yet another embodiment, the base stream may first be compressed and quantized and the difference of the other stream's CQI with respect to this quantized output may be selected for further compression and quantization.

FIG. 11 illustrates MIMO joint difference coding CQI compression 1100 for feed back to a base station constructed according to the principles of the present disclosure. This is an extension of the mean and differential CQI compression approach previously presented. Here, the mean is computed across all sub-bands and all streams. Then, for each (stream, sub-band) the difference with respect to the mean is fed back. This method is based on the fact that the spatial variation and the variation across frequencies are both small compared to the wideband CQI (e.g., mean), which is determined by the geometry of the UE.

FIG. 12 illustrates a flow diagram of an embodiment of a method of operating a feedback generator 1200 carried out according to the principles of the present disclosure. The method 1200 is for use in an OFDMA system and starts in a step 1205. Then, user equipment as employed in the OFDMA system is provided in a step 1210. A compressed channel quality indicator (CQI) for the user equipment corresponding to at least one sub-band is provided in a step 1215, where a sub-band is composed of one or more resource blocks.

In one embodiment, the compressed CQI corresponds to a predistorted CQI that provides a reduction in quantization error after restoration of the compressed CQI at a serving base station. Predistortion may be applied to other compression CQI approaches as an additional step in arriving at a compressed CQI. The compressed CQI may include a base CQI for a representative one of a set of sub-bands and a differential CQI relative to the base CQI for a remainder of the set of sub-bands. Alternately, the compressed CQI may correspond to a down-sampled CQI that provides a CQI value for each of a subset of sub-bands.

In one embodiment, the compressed CQI includes a wideband CQI that provides a single representative CQI for a set of sub-bands and a differential CQI relative to the wideband CQI for each of the sub-bands in the set. Alternatively, a single differential CQI relative to the wideband CQI may be provided for a selected subset of the set of sub-bands. Additionally, the compressed CQI may also include corresponding positions of the selected subset of sub-bands. The subset of sub-bands may correspond to a group of best CQI sub-bands chosen from the set of sub-bands.

The compressed CQI may correspond to a wavelet-based CQI that provides a wavelet based on orthogonalizing a basis vector for a mean and differential CQI. Alternatively, the compressed CQI may correspond to a hierarchical granularity refinement CQI that provides difference-based wavelet coefficients chosen in time for a recursively divided set of sub-bands.

In one embodiment, the compressed CQI may correspond to a codebook that consists of a plurality of CQI profiles across sub-bands. Additionally, the compressed CQI may correspond to an index for a codebook element that is closest to an actual differential CQI vector. Alternatively, the compressed CQI may correspond to a basis function representing at least one sub-band CQI selected from a set of sub-band CQIs for the transmission bandwidth.

The compressed CQI may correspond to each of a set of compressed CQIs for each sub-band that is determined independently for each of a plurality of spatial transmission streams. Additionally, the compressed CQI may correspond to a spatially differential CQI for each sub-band that is determined as a difference CQI between a referenced one of a plurality of spatial transmission streams and each remaining one of the plurality of spatial transmission streams. Alternatively, the compressed CQI may correspond to a joint difference CQI for each sub-band that is determined as a difference CQI between each of a plurality of spatial transmission streams and a wideband CQI across the plurality of spatial streams for a set of sub-bands. The compressed CQI is transmitted to a serving base station in a step 1220, and the method 1200 ends in a step 1225.

FIG. 13 illustrates a flow diagram of an embodiment of a method of operating a feedback decoder 1300 carried out according to the principles of the present disclosure. The method 1300 is for use in an OFDMA system and starts in a step 1305. Then, a base station as employed in the OFDMA system is provided in a step 1310. A compressed channel quality indicator (CQI) is received in the base station from user equipment corresponding to at least one sub-band, where the one sub-band is composed of at least one resource block, in a step 1215. A restored CQI from the compressed CQI is provided for the at least one sub-band in a step 1320. In one embodiment, the restored CQI may be derived from a predistorted CQI compression that provides a reduction in quantization error. Alternatively, the restored CQI may be derived from a wavelet-based CQI compression.

In one embodiment, the restored CQI is derived from a wideband CQI that provides a single representative CQI for a set of sub-bands and a differential CQI relative to the wideband CQI for each sub-band of the set of sub-bands. Alternatively, a single differential CQI relative to the wideband CQI may be provided for a selected subset of the set of sub-bands. Additionally, corresponding positions of the selected subset of sub-bands may be included. The selected subset of sub-bands may correspond to a group of best CQI sub-bands chosen from the set of sub-bands.

The restored CQI may be derived from a compressed CQI corresponding to a codebook that consists of a plurality of CQI profiles across sub-bands. Alternatively, the restored CQI may be derived from a selective sub-band CQI compression. Additionally, the restored CQI may be derived from a compressed CQI corresponding to a single transmission stream or a compressed CQI corresponding to a plurality of spatial transmission streams. The method 1300 ends in a step 1325.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which the disclosure relates will appreciate that other and further additions, deletions, substitutions and modifications may be made to the described example embodiments without departing from the the disclosure.

What is claimed is:

1. A feedback generator in a user equipment for use in an OFDMA system, comprising:
    a CQI compression module configured to provide a compressed channel quality indicator (CQI) for the user equipment corresponding to at least one sub-broad where a sub-band is composed of at least one resource block, wherein the compressed CQI corresponds to a down-sampled CQI that provides a CQI value for each of a subset of sub-bands; and
    a transmit module coupled to the CQI compression module and configured to transmit the compressed CQI to a serving base station.

2. The feedback generator as recited in claim 1 wherein the compressed CQI corresponds to a predistorted CQI that provides a reduction in quantization error after restoration of the compressed CQI at the serving base station.

3. A feedback generator in a user equipment for use in an OFDMA system, comprising:
    a CQI compression module configured to provide a compressed channel quality indicator (CQI) for the user equipment corresponding to at least one sub-band where a sub-band is composed of at least one resource block, wherein the compressed CQI includes a base CQI for a representative one of a set of sub-bands and a differential CQI relative to the base CQI for a remainder of the set of sub-bands; and
    a transmit module coupled to the CQI compression module and configured to transmit the compressed CQI to a serving base station.

4. A feedback generator in a user equipment for use in an OFDMA system, comprising:
a CQI compression module configured to provide a compressed channel quality indicator (CQI) for the user equipment corresponding to at least one sub-band where a sub-band is composed of at least one resource block, wherein the compressed CQI includes a wideband CQI that provides a single representative CQI for a set of sub-bands and a differential CQI relative to the wideband CQI for each sub-band of the set of sub-bands; and
a transmit module coupled to the CWI compression module and configured to transmit the compressed CQI to a serving base station.

5. A feedback generator in a user equipment for use in an OFDMA system, comprising:
a CQI compression module configured to provide a compressed channel quality indicator (CQI) for the user equipment corresponding to at least one sub-hand where a sub-band is composed of at least one resource block, wherein the compressed CQI includes a wideband CQI that provides a single representative CQI for a set of sub-bands and a single differential CQI relative to the wideband CQI for a selected subset of the set of sub-bands; and
a transmit module coupled to the CQI compression module and configured to transmit the compressed CQI to a serving base station.

6. The feedback generator as recited in claim 5 wherein the compressed CQI includes corresponding positions of the selected subset of the set of sub-bands.

7. The feedback generator as recited in claim 5 wherein the selected subset of the set of sub-bands corresponds to a group of CQI sub-bands chosen by the user equipment from the set of sub-bands.

8. The feedback generator as recited in claim 1 wherein the compressed CQI corresponds to a wavelet-based CQI that provides a wavelet based on orthogonalizing a basis vector for a mean and differential CQI.

9. The feedback generator as recited in claim 1 wherein the compressed CQI corresponds to a hierarchical granularity refinement CQI that provides difference-based wavelet coefficients chosen in time for a recursively divided set of sub-bands.

10. The feedback generator as recited in claim 1 wherein the compressed CQI corresponds to a codebook that consists of a plurality of CQI profiles across sub-bands.

11. The feedback generator as recited in claim 1 wherein the compressed CQI corresponds to an index for a codebook element that is closest to an actual differential CQI vector.

12. The feedback generator as recited in claim 1 wherein the compressed CQI corresponds to a basis function representing at least one sub-band CQI selected from a set of sub-band CQIs for an assigned transmission bandwidth.

13. The feedback generator as recited in claim 1 wherein the compressed CQI corresponds to each of a set of compressed CQIs for each sub-band that is determined independently for each of a plurality of spatial transmission streams.

14. The feedback generator as recited in claim 1 wherein the compressed CQI corresponds to a spatially differential CQI for each sub-band that is determined as a difference CQI between a referenced one of a plurality of spatial transmission streams and each remaining one of the plurality of spatial transmission streams.

15. The feedback generator as recited in claim 1 wherein the compressed CQI corresponds to a joint difference CQI for each sub-band that is determined as a difference CQI between each of a plurality of spatial transmission streams and a wideband CQI across the plurality of spatial streams for a set of sub-bands.

16. A method of operating a feedback generator in a user equipment for use in an OFDMA system, comprising:
providing a compressed channel quality indicator (CQI) for a user equipment corresponding to at least one sub-broad where a sub-band is composed of at least one resource block, wherein the compressed CQI corresponds to a down-sampled CQI that provides a CQI value for each of a subset of sub-bands; and
transmitting the compressed CQI to a serving base station.

17. The method as recited in claim 16 wherein the compressed CQI corresponds to a predistorted CQI that provides a reduction in quantization error after restoration of the compressed CQI at the serving base station.

18. A method of operating a feedback generator in a user equipment for use in an OFDMA system, comprising:
providing a compressed channel quality indicator (CQI) for a user equipment corresponding to at least one sub-band where a sub-band is composed of at least one resource block wherein the compressed CQI includes a base CQI for a representative one of a set of sub-bands and a differential CQI relative to the base CQI for a remainder of the set of sub-bands; and
transmitting the compressed CQI to a serving base station.

19. The method as recited in claim 16 wherein the compressed CQI corresponds to a down-sampled CQI that provides a CQI value for each of a subset of sub-bands.

20. A method of operating a feedback generator in a user equipment for use in an OFDMA system, comprising:
providing a compressed channel quality indicator (CQI) for a user equipment corresponding to at least one sub-band where a sub-band is composed of at least one resource block, wherein the compressed CQI includes a wideband CQI that provides a single representative CQI for a set of sub-bands and a differential CQI relative to the wideband CQI for each sub-band of the set of sub-bands; and
transmitting the compressed CQI to a serving base station.

21. A method of operating a feedback generator in a user equipment for use in an OFDMA system, comprising:
providing a compressed channel quality indicator (CQI) for a user equipment corresponding to at least one sub-band where a sub-band is composed of at least one resource block, wherein the compressed CQI includes a wideband CQI that provides a single representative CQI for a set of sub-bands and a single differential CQI relative to the wideband CQI for a selected subset of the set of sub-bands; and
transmitting the compressed CQI to a serving base station.

22. The method as recited in claim 21 wherein the compressed CQI also includes corresponding positions of the selected subset of the set of sub-bands.

23. The method as recited in claim 21 wherein the selected subset of the set of sub-bands corresponds to a group of best CQI sub-bands chosen from the set of sub-bands.

24. The method as recited in claim 16 wherein the compressed CQI corresponds to a wavelet-based CQI that provides a wavelet based on orthogonalizing a basis vector for a mean and differential CQI.

25. The method as recited in claim 16 wherein the compressed CQI corresponds to a hierarchical granularity refinement CQI that provides difference-based wavelet coefficients chosen in time for a recursively divided set of sub-bands.

26. The method as recited in claim 16 wherein the compressed CQI corresponds to a codebook that consists of a plurality of CQI profiles across sub-bands.

27. The method as recited in claim 16 wherein the compressed CQI corresponds to an index for a codebook element that is closest to an actual differential CQI vector.

28. The method as recited in claim 16 wherein the compressed CQI corresponds to a basis function representing at least one sub-band CQI selected from a set of sub-band CQIs for an assigned transmission bandwidth.

29. The method as recited in claim 16 wherein the compressed CQI corresponds to each of a set of compressed CQIs for each sub-band that is determined independently for each of a plurality of spatial transmission streams.

30. The method as recited in claim 16 wherein the compressed CQI corresponds to a spatially differential CQI for each sub-band that is determined as a difference CQI between a referenced one of a plurality of spatial transmission streams and each remaining one of the plurality of spatial transmission streams.

31. The method as recited in claim 16 wherein the compressed CQI corresponds to a joint difference CQI for each sub-band that is determined as a difference CQI between each of a plurality of spatial transmission streams and a wideband CQI across the plurality of spatial streams for a set of sub-bands.

32. A feedback decoder in a base station for use in an OFDMA system, comprising:
a receive module configured to receive a non-redundant compressed channel quality indicator (CQI) in the base station from user equipment corresponding to at least one sub-band where one sub-band is composed of at least one resource block; and
a CQI restoration module coupled to the receive module and configured to provide a restored CQI from the compressed CQI for the at least one sub-band.

33. The feedback decoder as recited in claim 32 wherein the restored CQI is derived from a predistorted CQI compression that provides a reduction in quantization error.

34. The feedback decoder as recited in claim 32 wherein the restored CQI is derived from a wavelet-based CQI compression.

35. A feedback decoder in a base station for use in an OFDMA system, comprising:
a receive module configured to receive a compressed channel quality indicator (CQI) in the base station from user equipment corresponding to at least one sub-band where one sub-band is composed of at least one resource block; and
a CQI restoration module coupled to the receive module and configured to provide a restored CQI from the compressed CQI for the at least one sub-band, wherein the restored CQI is derived from a wideband CQI that provides a single representative CQI for a set of sub-bands and a differential CQI relative to the wideband CQI for each sub-band of the set of sub-bands.

36. A feedback decoder in a base station for use in an OFDMA system, comprising:
a receive module configured to receive a compressed channel quality indicator (CQI) in the base station from user equipment corresponding to at least one sub-band where one sub-band is composed of at least one resource block; and
a CQI restoration module coupled to the receive module and configured to provide a restored CQI from the compressed CQI for the at least one sub-band, wherein the compressed CQI includes a wideband CQI that provides a single representative CQI for a set of sub-bands and a single differential CQI relative to the wideband CQI for a selected subset of the set of sub-bands.

37. The feedback decoder as recited in claim 36 wherein the compressed CQI includes corresponding positions of the selected subset of the set of sub-bands.

38. The feedback decoder as recited in claim 36 wherein the selected subset of the set of sub-bands corresponds to a group of best CQI sub-bands chosen from the set of sub-bands.

39. The feedback decoder as recited in claim 32 wherein the restored CQI is derived from a compressed CQI corresponding to a codebook that consists of a plurality of CQI profiles across sub-bands.

40. The feedback decoder as recited in claim 32 wherein the restored CQI is derived from a selective sub-band CQI compression.

41. The feedback decoder as recited in claim 32 wherein the restored CQI is derived from one selected from a group consisting of:
a compressed CQI corresponding to a single transmission stream; and
a compressed CQI corresponding to a plurality of spatial transmission streams.

42. A method of operating a feedback decoder in a base station for use in an OFDMA system, comprising:
receiving a non-redundant compressed channel quality indicator (CQI) in the base station from user equipment corresponding to at least one sub-band where one sub-band is composed of at least one resource block; and
providing a restored CQI from the compressed CQI for the at least one sub-band.

43. The method as recited in claim 42 wherein the restored CQI is derived from a predistorted CQI compression that provides a reduction in quantization error.

44. The method as recited in claim 42 wherein the restored CQI is derived from a wavelet-based CQI compression.

45. A method of operating a feedback decoder in a base station for use in an OFDMA system, comprising:
receiving a compressed channel quality indicator (CQI) in the base station from user equipment corresponding to at least one sub-band where one sub-band is composed of at least one resource block; and
providing a restored CQI from the compressed CQI for the at least one sub-band wherein the restored CQI is derived from a wideband CQI that provides a single representative CQI for a set of sub-bands and a differential CQI relative to the wideband CQI for each sub-band of the set of sub-bands.

46. A method of operating a feedback decoder in a base station for use in an OFDMA system, comprising:
receiving a compressed channel quality indicator (CQI) in the base station from user equipment corresponding to at least one sub-band where one sub-band is composed of at least one resource block, wherein the compressed CQI includes a wideband CQI that provides a single representative CQI for a set of sub-bands and a single differential CQI relative to the wideband CQI for a selected subset of the set of sub-bands; and
providing a restored CQI from the compressed CQI for the at least one sub-band.

47. The method as recited in claim 46 wherein the compressed CQI includes corresponding positions of the selected subset of the set of sub-bands.

48. The method as recited in claim 46 wherein the selected subset of the set of sub-hands corresponds to a group of best CQI sub-bands chosen from the set of sub-bands.

49. The method as recited in claim 42 wherein the restored CQI is derived from a compressed CQI corresponding to a codebook that consists of a plurality of CQI profiles across sub-bands.

50. The method as recited in claim 42 wherein the restored CQI is derived from a selective sub-band CQI compression.

51. The method as recited in claim 42 wherein the restored CQI is derived from one selected from a group consisting of:

a compressed CQI corresponding to a single transmission stream; and a compressed CQI corresponding to a plurality of spatial transmission streams.

* * * * *